(12) United States Patent
Courtney

(10) Patent No.: US 9,779,773 B1
(45) Date of Patent: Oct. 3, 2017

(54) CONTACT INDUCED DATA STORAGE DEVICE DESTRUCTION

(71) Applicant: Seagate Technology LLC, Cupertino, CA (US)

(72) Inventor: Timothy J. Courtney, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/417,894

(22) Filed: Jan. 27, 2017

Related U.S. Application Data

(60) Provisional application No. 62/430,619, filed on Dec. 6, 2016.

(51) Int. Cl.
| | |
|---|---|
| *G11B 15/04* | (2006.01) |
| *G11B 20/00* | (2006.01) |
| *G11B 5/55* | (2006.01) |
| *G11B 5/56* | (2006.01) |
| *G11B 5/00* | (2006.01) |

(52) U.S. Cl.
CPC ...... *G11B 20/00927* (2013.01); *G11B 5/5521* (2013.01); *G11B 5/56* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,410,439 A | 4/1995 | Egbert et al. | |
| 5,896,255 A * | 4/1999 | Mardirossian | G11B 23/0302 360/133 |
| 6,262,572 B1 | 7/2001 | Franco et al. | |
| 6,501,606 B2 | 12/2002 | Boutaghou et al. | |
| 7,314,404 B2 | 1/2008 | Singh et al. | |
| 8,149,514 B2 | 4/2012 | Bito et al. | |
| 8,427,770 B1 | 4/2013 | O'Dell et al. | |
| 8,618,793 B2 | 12/2013 | Duan et al. | |
| 8,643,981 B2 | 2/2014 | Natori | |

* cited by examiner

*Primary Examiner* — K. Wong
(74) *Attorney, Agent, or Firm* — Hall Estill Attorneys at Law

(57) ABSTRACT

A data storage device may be destroyed by suspending a transducing head above a data storage medium prior to inducing contact of the transducing head with a first layer of the data storage medium in response to a signal from a controller. Deflection of the transducing head can then be increased to penetrate to a destroy depth in a second layer of the data storage medium that is maintained while the data storage medium spins. The controller may then issue at least one data read command to access data from the data storage medium and when a data read error is received, the data storage medium and transducing head can be verified as destroyed and incapable of accessing data previously written to the data storage medium.

20 Claims, 3 Drawing Sheets

CONTACT INDUCED DATA STORAGE DEVICE DESTRUCTION

RELATED APPLICATION

The present application makes a claim of domestic priority under 35 U.S.C. 119(e) to U.S. Provisional Application No. 62/430,619 filed Dec. 6, 2016, the contents of which are hereby incorporated by reference.

SUMMARY

A data storage device may be destroyed, in accordance with some embodiments, by suspending a transducing head above a data storage medium prior to inducing contact of the transducing head with a first layer of the data storage medium in response to a signal from a controller. Deflection of the transducing head is then increased to penetrate to a destroy depth in a second layer of the data storage medium. The destroy depth is maintained while the data storage medium spins and the controller issues at least one data read command to access data from the data storage medium. When a data read error is received, the data storage medium and transducing head is verified as destroyed and incapable of accessing data previously written to the data storage medium.

DETAILED DESCRIPTION

Data is being generated, transferred, and stored in greater volumes and with greater speed than ever before. The proliferation of fast data processing and large data storage capacities has allowed greater amounts of user-unique, personal data to be intentionally, or unintentionally stored in local and remote data storage devices. The trend of remotely storing large amounts of data, such as with cloud computing, further proliferates the dissemination of personal data, which may be confidential and highly sensitive.

Increased amounts of available data storage capacity can correspond with large numbers of separate data storage devices that are collectively packaged. In the event a local, or remote, data storage device is to be retired, due to either degraded performance or failure, personal data may remain on the device and can be accessed by others. Hence, various embodiments are directed to a data storage device that can self-destruct to a degree where no previously stored data can be detected or recovered.

Figure 1:
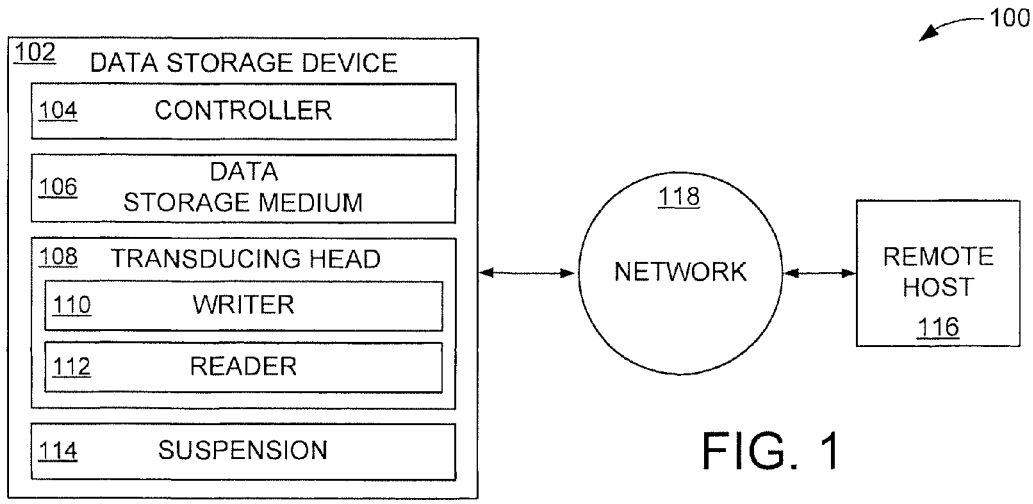
FIG. 1 is a block representation of an example portion of a data storage system configured and operated in accordance with some embodiments.

FIG. 1 illustrates a block representation of an example data storage system 100 that can utilize one or more data storage devices 102 in a local, or remote, structure. It is contemplated that the data storage device 102 can be any type, size, capacity, and speed, as facilitated by a local controller 104, magnetic data storage medium 106, and transducing head 108. The controller 104 can direct data access operations of data writer 110 and data reader 112 portions of the transducing head 108 as well as operation of a suspension 114, which can have a head-gimbal assembly (HGA) and actuating means.

Any number of data storage devices 102 can be interconnected locally or with one or more remote hosts 116. A remote host 116, such as a node, processor, or memory, can complement the local controller 104 or autonomously conduct operations of the data storage device 102 via a wired or wireless network 118. The data storage system 100 can be autonomous or operate in concert with other data storage devices, servers, and systems to provide a data capacity, such as in a cloud computing environment.

Figure 2:
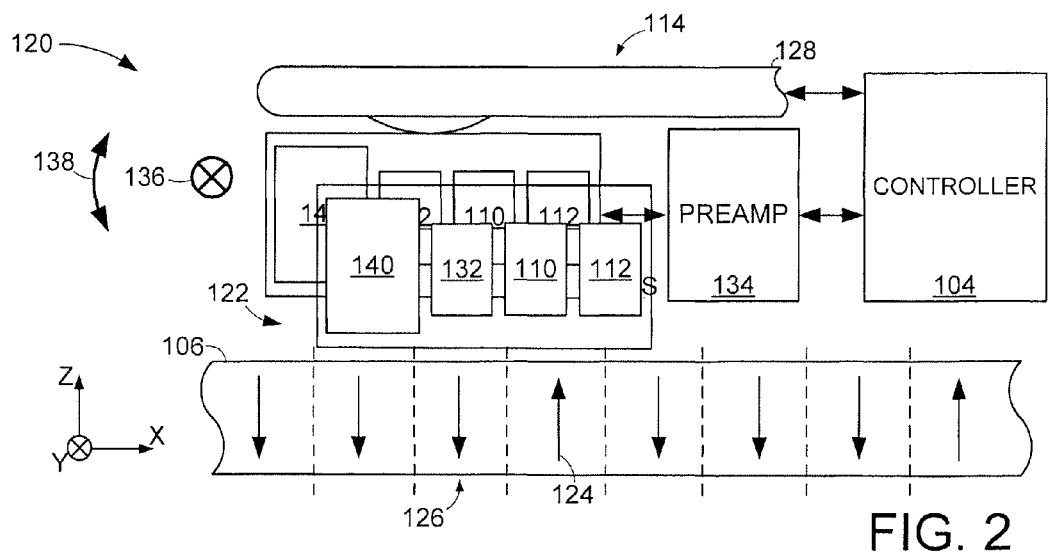
FIG. 2 shows a cross-sectional block representation of a portion of an example data storage device capable of being utilized in the data storage system of FIG. 1.

FIG. 2 is a cross-sectional block representation of a portion of a data storage device 120 that may be employed in the data storage system 100 of FIG. 1. The data storage device 120 utilizes a suspension 114 to position the transducing head 108 on an air bearing 122 over selected data bits 124 stored in data tracks 126 on the data storage medium 106. The suspension 114 can involve a load beam 128 and HGA 130 that allow the data writer 110 and reader 112 to magnetically access one or more data bits 124.

While the suspension 114 can generally position the transducing head 108 above the data storage medium 106, reduced air bearing 122 sizes and an imperfect top data storage medium surface can degrade the air bearing 122 and data access performance. Hence, the transducing head 108 can be articulated along the X-Z plane by a heater 132 that is directed by the controller 104 and powered by a preamp 134. That is, an actuating means of the suspension 114 can control X-Y plane movement, as shown by arrow 136, and a heater 132 can control X-Z plane movement, as shown by arrow 138.

For most data access operations, the air bearing 122 is maintained at a particular separation distance, which may be as small as a few nanometers, by the suspension 114 and heater 132. The transducing head 108 may also have one or more sensors dedicated to measuring fly height, such as a dual ended temperature coefficient of resistance (DETCR) sensor 140. The DETCR sensor 140 can be utilized during fly height calibration and afterwards to detect thermal asperity (contact) events between the head 108 and storage medium 106. As shown, the DETCR sensor 140 can have a greater relative size compared to the writer 110, reader 112, and heater 132.

It is contemplated that the suspension 114, DETCR 140, and heater 132 can be used to maintain contact between the transducing head 108 and a top surface of the data storage medium 106. However, conducting data access operations while the transducing head 108 contacts the data storage medium 106 can be plagued by structural and operational variability, particularly in high data density environments where the medium is spinning at 5000 rpm or more. Hence, contact between the transducing head 108 and data storage medium 106 is generally discouraged with the heater's main function being the prevention of head-medium contact.

Figure 3:
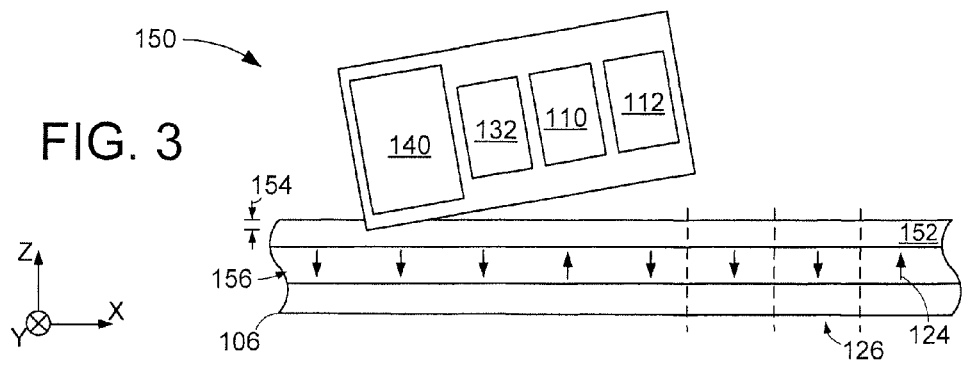
FIG. 3 displays a block representation of a portion of an example data storage device operated as part of the data storage system of FIG. 1.

FIG. 3 displays a block representation of a portion of a data storage device 150 where a transducing head 108 contacts a protective top layer 152 of the data storage medium 106. It is noted that contact between the transducing head 108 and medium 106 can occur in a variety of manners, such as a leading edge, trailing edge, or any portion of an air bearing surface (ABS) engaging the protective layer 152.

The controller 104 can employ any number of sensors, such as acoustic, vibration, and/or resistance sensors, to detect the head-medium contact. The controller 104 can, in some embodiments, can detect, or compute, the severity of the head-medium contact, which can be characterized as the depth 154 from the ABS of the medium 106. Therefore, the controller 104 is able to distinguish that the transducing head 108 is in the protective layer 152 or in an underlying recording layer 156.

While normal data storage device 150 operation would move the transducing head 108 to reduce and mitigate the damage done by the head-medium contact, such as through the creation of debris and hampered performance of the data writer 110 and/or reader 112, various embodiments respond to detected head-medium contact with the protective top layer 152 by exacerbating head movement into the medium 106.

Figure 4:
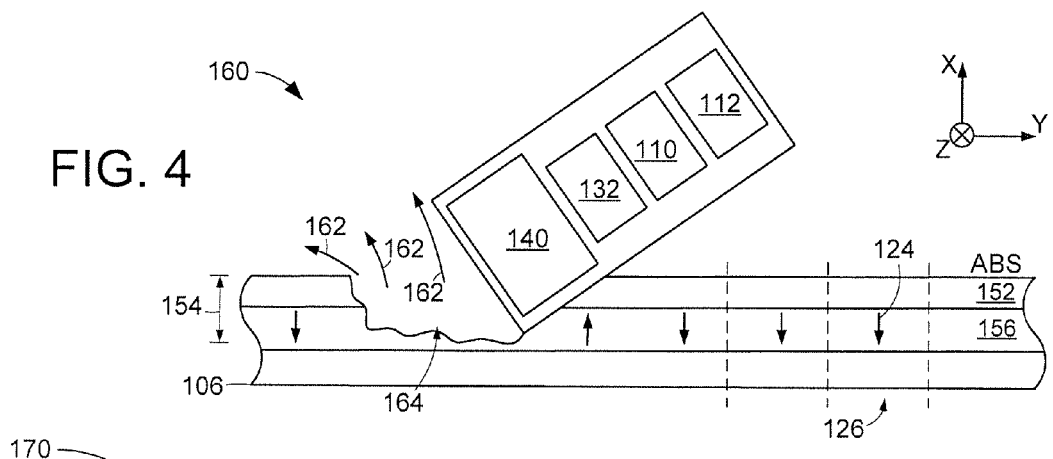
FIG. 4 represents a portion of an example data storage device constructed and operated in accordance with some embodiments.

FIG. 4 is a side view block representation of a portion of a data storage device 160 that expressly sends the transducing head 108 into the recording layer 146 of the data storage medium 106 to create as much debris 162 and damage to the device 160 as possible. While not limiting, the penetration of the transducing head 108 into the recording layer 146 can be facilitated by increasing the signal to the heater 132 compared to the signal associated with the protective layer depth of FIG. 3. It is contemplated that the heater signal is maxed to ensure that the transducing head 108 is gouging the data storage medium 106 with as much force as possible.

As a result of the induced head-medium contact, a trench 164 is created that is physically void of magnetic recording layer 146 material. Hence, the physical impact, and resultant heat, physically eliminates any data bits, and magnetic bit grains, in the path of the head 108. While physical damage to the recording layer 146 is useful, the trauma associated with continuous, sporadic, and/or random contact with the recording layer 146 causes the transducing head to malfunction. For instance, the heat of physical contact with the recording layer 146 can melt electrical traces, remove magnetically sensitive portions of a data reader 112, and disturb the shape of data writer components so that no data access operations can be conducted. Accordingly, the head-medium contact shown in FIG. 4 causes both the transducing head 108 and data storage medium 106 to become inoperable, which protects any confidential data that may remain stored in the data storage medium 106.

Figure 5:
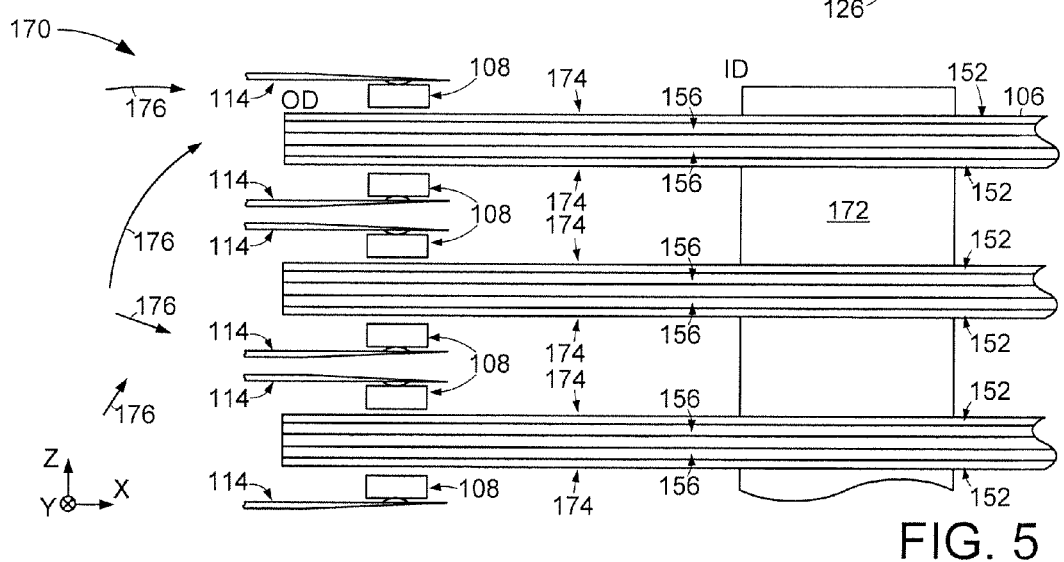
FIG. 5 illustrates a block representation of a portion of an example data storage device that can employ various embodiments of the present disclosure.
Figure 6:
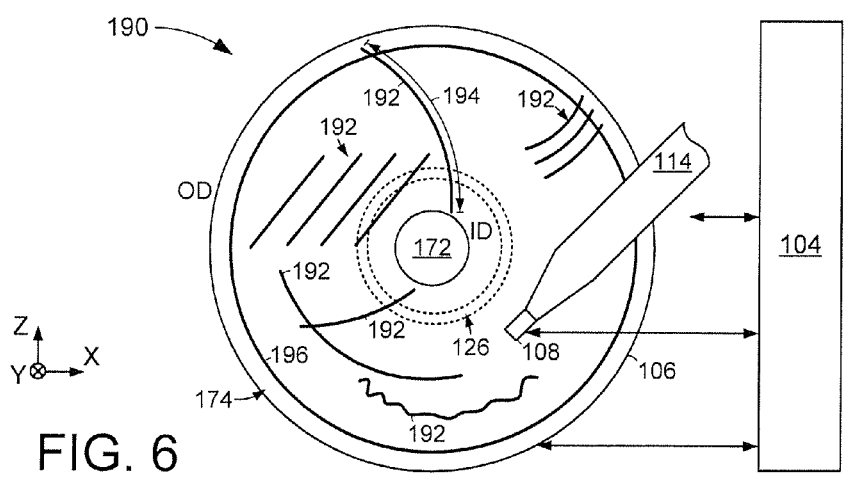
FIG. 6 is a top view line representation of a portion of an example data storage device employed in the data storage system of FIG. 1.

With the creation of debris 162 via the head-medium contact, an entire data storage device can be rendered inoperable (destroyed). FIG. 5 represents a portion of an example data storage device 170 that has a plurality of data storage media 106 vertically stacked to spin about a common spindle 172. It is noted that each data storage medium 106 is accessed by multiple transducing heads 108 that are separately controlled by respective suspensions 114.

Through the creation of debris 162 from head-medium contact on as few as one recording surface 174, the operation of all heads 108 and media 106 can be degraded to the point of being inoperable. That is, debris 162 contaminates every recording surface 174 of the data storage device 170 and eventually causes transducing head 108 damage and failure. Hence, a data storage device 170 can be destroyed by crashing less than all the transducing head 108 present in the device 170.

In some embodiments, all the transducing heads 108 of the data storage device 170 are concurrently or consecutively crashed into the recording layers of the respective data storage media 106 to ensure no data access component of the data storage device 170 is operable. Such physical destruction can result in the production of debris 176 that are pieces of the transducing head 108, reader 112, writer 110, heater 132, DETCR 140, and media 106. While movement of the media 106 by the spindle 172 can disseminate debris throughout the device 170, portions of the drive 170 may be configured to promote debris 176 dispersion, such as curvilinear interior device surfaces, magnets, and active mechanisms, like a fan.

It is contemplated that one or more transducing heads 108 are crashed into an adjacent data storage medium 106 while the medium is stationary. However, various embodiments simultaneously control motion of the data storage media 106 via the spindle 172 while the head(s) 108 gouge into the recording layer 146 in order to effect the maximum damage to the data storage device 170. The top view line representation of an example data storage device 190 illustrates how a transducing head 108 can produce tracks 192 in the recording surface 174 of a data storage medium 106.

While a single track 192 can be used to render the data storage device 190 inoperable, some embodiments strategically create multiple tracks 192 that each continuously extend into the recording layer of the recording surface 174. With multiple tracks 192, a controller 104 can produce different, or similar, track 192, shapes, sizes, and depths by manipulating the head heater 132 as well as the spindle 172. For example, a controller 104 may designate different tracks 192 to be different lengths 194 and/or depths into the recording layer 146, as executed by the controller 104 issuing specific seek operations with the suspension 114 actuator while the medium 106 spins.

The ability to control the configuration of a track 192 allows for the controller 104 to produce partial or complete circles 196, or ellipses, that follow one or more data tracks, as designated by non-user data stored in the medium 106. A single track 192 may also follow a single data track or cross multiple different data tracks. As such, a controller 104 can orchestrate a pattern of separate tracks 192 that is asymmetrical or symmetrical radially, laterally across the X axis, or vertically across the Y axis. The use of multiple intersecting tracks 192 can ensure some regions of the recording surface 174 are destroyed, such as designated cache regions or physical block addresses assigned with personal and/or confidential data. The use of multiple tracks 192, and or multiple passes along the same track 192 path, may further ensure the transducing head 108 penetrates into the recording layer 108 to the designated depth.

In a non-limiting example, the controller 104 performs at least one seek operation with the transducing head 108 that continuously extends from the ID to the OD while the medium 106 spins at a uniform speed, such as 5400 rpm. It is contemplated that the medium 106 spin velocity varies while a track 192 is being created and/or between the creation of tracks 192, which can produce different track 192 shapes and cross-sectional profiles that can produce more, or less, debris 162.

Figure 7:
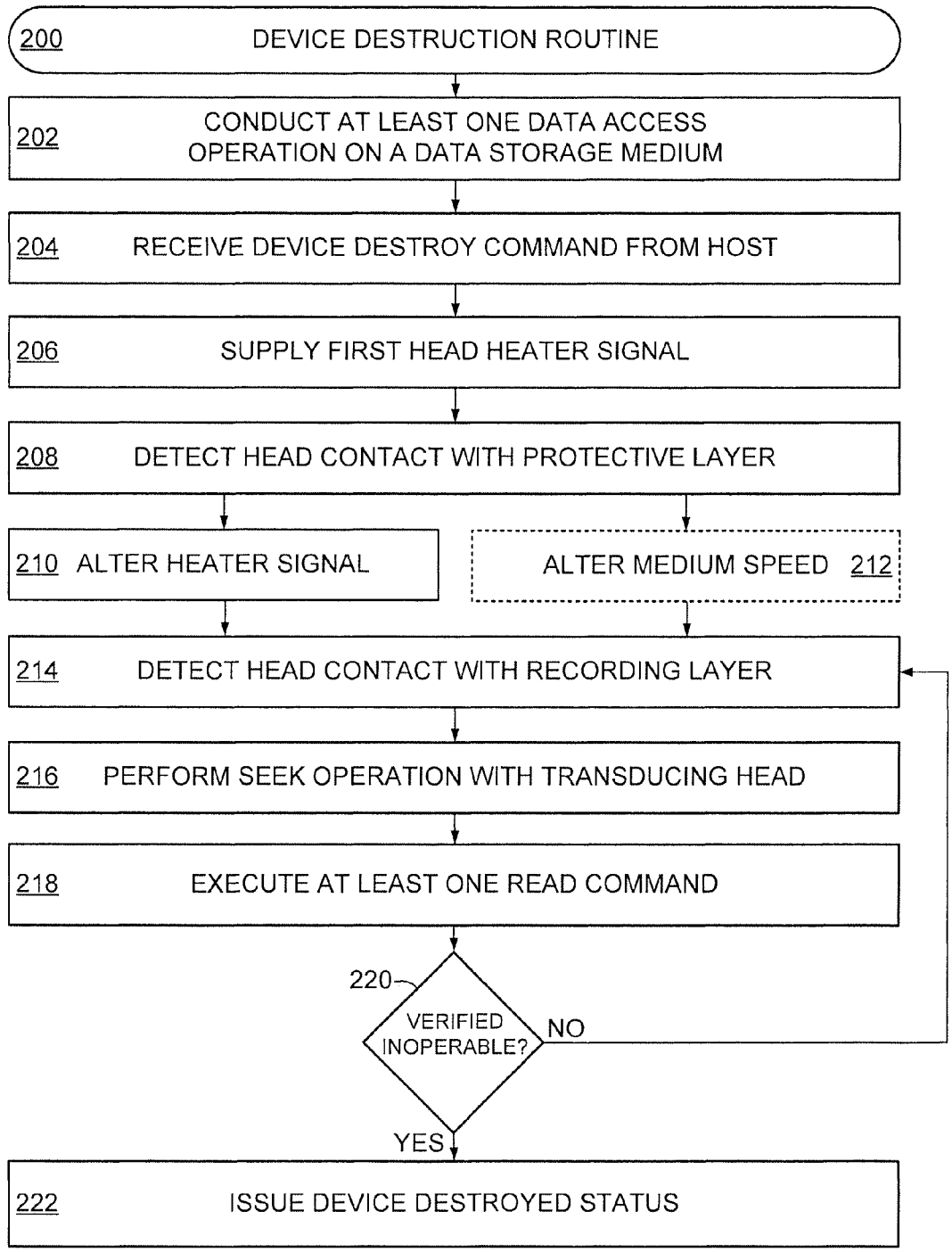
FIG. 7 provides a flowchart for an example data storage device destruction routine that may be executed by the data storage system of FIG. 1.

FIG. 7 provides an example device destruction routine 200 that can be carried out in accordance with various embodiments. At least one data access operation is carried out in step 202, such as writing data to or reading data from a recording layer of a data storage medium. It is to be understood that step 202 is to be executed with a functioning data storage device that has been manufactured, tested, and employed by an end-user, such as a customer, that has previously stored user data to the data storage medium.

At some time after step 202, a host issues a device destroy command that is received by a local controller in step 204 and triggers a first head heater signal to be supplied a heater in step 206 while the transducing head is positioned over a predetermined portion of the data storage medium, such as the ID or OD. It is noted that an additional step may be incorporated into routine 200 that specifically actuates the transducing head to a destroy position relative to the underlying recording surface. The first head heater signal causes the transducing head to come into contact with the protective top layer of the data storage medium that is detected in step 208, which may occur by monitoring the position error signal of the head relative to servo data stored on the medium.

With the transducing head contacting the protective top layer, the controller may increase the head heater signal to a second signal strength in step 210 and/or alter the rate at which the data storage medium spins, as illustrated by optional, segmented step 212. That is, the controller can conduct steps 210 and 212 independently, concurrently, or consecutively, to produce a gouge track (192) configuration where the transducing head continuously penetrates the recording layer of the data storage medium. For clarity, step 210 can maintain the first head heater signal or increase the signal to ensure the head penetrates through the top protective layer to the underlying recording layer.

Penetration of the head into the medium's recording layer is detected in step 214, such as by sensing head deflection, head temperature, or spindle resistance. Reaching the prescribed medium depth prompts step 216 to perform at least one seek operation in accordance with the predetermined gouge track configuration, such as from the ID to the OD, or vice-versa. It is noted that step 216 can involve generating multiple different gouge tracks that may intersect, or not.

The execution of a gouge track pattern on the data storage medium may be accompanied by the dissemination of debris via a debris promoter. Next, step 222 issues at least one data read command. Such read command can be conducted at one or more regions of the data storage medium continuously, or periodically, to confirm the transducing head and/or the data storage medium is inoperable. In some embodiments, the back electromotive force (EMF) of the actuating suspension can be employed in step 218 to further apply pressure from the transducing head onto the data storage medium. The use of back EMF can allow step 218 to maintain, or increase, physical head-media contact even when all data readers are destroyed and return errors during step 218.

Decision 220 utilizes the read commands of step 218 to verify that the gouge tracks and/or debris resulting from the gouge tracks have rendered the data storage device inoperable. Decision 220 may perform read and/or write commands to non-gouged recording surfaces in a data storage device to provide a comprehensive conclusion that the data storage device is not capable of data storage or retrieval. A determination in decision 220 that at least a part of the data storage device is operable advances routine 200 back to step 214 so that further gouge tracks and debris can be generated.

However, if decision 220 determines the device is effectively dead, the local controller issues a device destroyed command in step 222 along with purging any data from local cache, such as volatile and/or non-volatile cache memories located in the data storage device. With step 222 issuing the destroyed command to a host, the data storage device is rendered useless and can be safely removed from service without concern for the previously stored data being retrieved.

What is claimed is:

1. A method comprising:
   suspending a transducing head above a data storage medium where data is stored;
   inducing contact of the transducing head with a first layer of the data storage medium in response to a signal from a controller;
   increasing deflection of the transducing head to penetrate into a second layer of the data storage medium;
   spinning the data storage medium while the transducing head penetrates the second layer; and
   destroying the transducing head and data storage medium so that data of the data storage medium is not readable.

2. The method of claim 1, wherein the contact with the first and second layers are achieved by activating a heater of the transducing head with the controller.

3. The method of claim 1, wherein the controller conducts seek operations with the transducing head while the transducing head penetrates the second layer.

4. The method of claim 3, wherein the seek operations continuously extend from an inner diameter of the data storage medium to an outer diameter of the data storage medium.

5. The method of claim 1, wherein the controller raises the transducing head above the data storage medium after the spinning step.

6. The method of claim 5, wherein the controller subsequently lowers the transducing head to penetrate into the second layer.

7. The method of claim 6, wherein the controller produces a pattern of separated gouge tracks on the data storage medium.

8. The method of claim 3, wherein the seek operations produce a continuously curvilinear gouge track into the second layer.

9. A method comprising:
   suspending a transducing head above a first data storage medium;
   inducing contact of the first transducing head with a first layer of the first data storage medium in response to a signal from a controller;
   increasing deflection of the first transducing head to a destroy depth that penetrates to a second layer of the first data storage medium;
   maintaining destroy depth while the first data storage medium spins;
   issuing a data read command with the controller to access data from the first data storage medium; and
   receiving a data read error to ensure the first data storage medium and first transducing head are incapable of accessing data previously written to the first data storage medium.

10. The method of claim 9, wherein the controller confirms the maintaining step produces debris.

11. The method of claim 10, wherein the controller senses debris being present on a second data storage medium connected to the first data storage medium via a spindle.

12. The method of claim 9, wherein the controller concurrently conducts the inducing, increasing, and maintaining steps with a second transducing head and a second data storage medium, the first and second data storage media connected via a spindle.

13. The method of claim 9, wherein the controller conducts the inducing, increasing, and maintaining steps with less than all the transducing heads of a data storage device.

14. The method of claim 9, wherein the controller creates multiple gouge tracks into the second layer with different depths, the respective depths measured from an air bearing surface through the first layer.

15. An apparatus comprising a transducing head suspended above a data storage medium prior to contact of the transducing head with a first layer of the data storage medium in response to a signal from a controller, the controller configured to increase deflection of the transducing head to penetrate a second layer of the data storage medium while the data storage medium spins.

16. The apparatus of claim 15, wherein the transducing head is destroyed by the contact with the data storage medium.

17. The apparatus of claim 15, wherein the data storage medium is destroyed by the contact with the transducing head.

18. The apparatus of claim 15, wherein an actuating suspension articulates the transducing head while transducing head penetrates the second layer.

19. The apparatus of claim 15, wherein the first layer is a protective top layer positioned between an air bearing and the second layer.

20. The apparatus of claim 15, wherein the second layer is a magnetic recording material.

* * * * *